J. A. GOLDEN.
MOVING PICTURE CAMERA.
APPLICATION FILED APR. 12, 1911. RENEWED MAY 11, 1914.

1,102,261.

Patented July 7, 1914.

2 SHEETS—SHEET 1.

Witnesses:

Joseph A. Golden, Inventor,
By his Attorneys

J. A. GOLDEN.
MOVING PICTURE CAMERA.
APPLICATION FILED APR. 12, 1911. RENEWED MAY 11, 1914.

1,102,261.

Patented July 7, 1914.
2 SHEETS—SHEET 2.

UNITED STATES PATENT OFFICE.

JOSEPH A. GOLDEN, OF NEW YORK, N. Y.

MOVING-PICTURE CAMERA.

1,102,261.  Specification of Letters Patent.  Patented July 7, 1914.

Application filed April 12, 1911, Serial No. 620,604. Renewed May 11, 1914. Serial No. 837,826.

*To all whom it may concern:*

Be it known that I, JOSEPH A. GOLDEN, a citizen of the United States, and a resident of the borough of Manhattan, city, county, and State of New York, have invented certain new and useful Improvements in Moving-Picture Cameras, of which the following is a specification.

The object of the present invention is first, to provide a camera capable of taking a series of pictures on a constantly moving sensitized film as distinguished from the ordinary intermittently movable film.

To this end, the invention comprises a moving picture camera having manually operated means for constantly moving a sensitized film through the optical field in combination with a suitable shutter adapted to intermittently expose the film, and a lens mounted in a suitable carrier provided with means for moving it downwardly at the same rate of speed as the travel of the film during the instant of exposure, and upwardly at a greater rate of speed during the period that the shutter is closed, the carrier moving means comprising a variable-leverage lever operatively connected to the carrier and the driving mechanism. The rapid upward or return movement of the lens places it in position to again move downwardly at the next exposure of the film. By this means, the successive exposures are made through the lens traveling in the same direction and at the same speed as the constantly moving film. The film, the shutter and the reciprocating lens are all driven through properly proportioned devices operated by the usual hand crank.

In order that my invention may be fully understood, I will first describe the same with reference to the accompanying drawings and afterward point out the novelty more particularly in the annexed claims.

Figure 2:
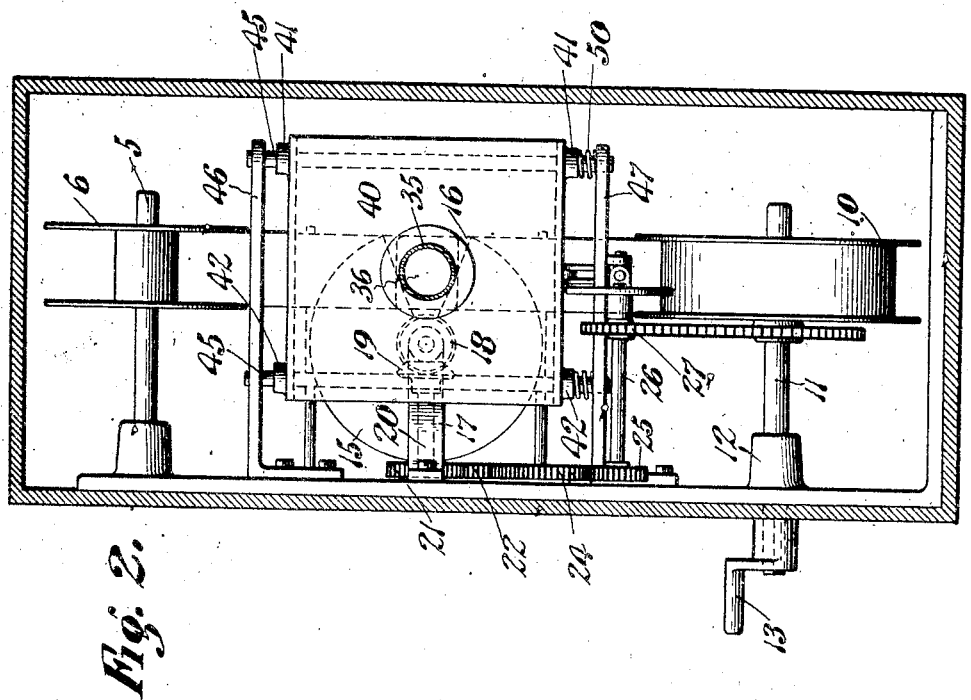
Figure 1:
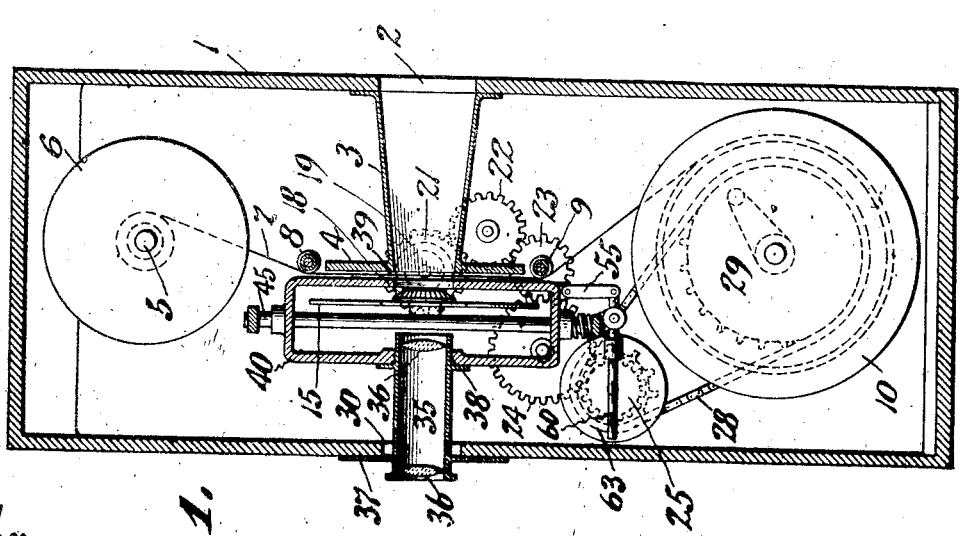
Figure 3:
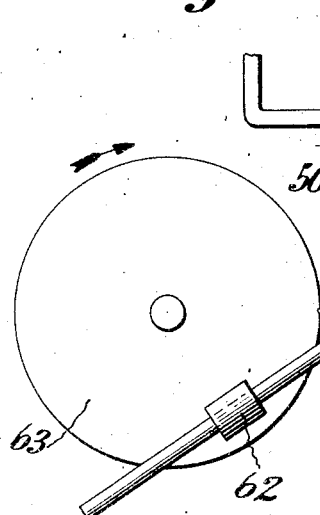
Figure 4:
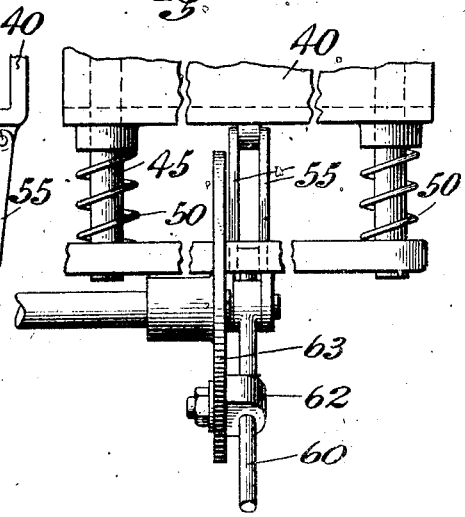

In said drawings: Figure 1 is a vertical longitudinal sectional view of a moving picture camera having my invention applied thereto. Fig. 2 is a vertical transverse sectional view of the same. Fig. 3 is a detail side elevation on a larger scale of the lens operating device. Fig. 4 is a front view of the same.

1 is the usual camera box formed in its rear wall with an opening 2 leading into a focusing tube 3 which is formed in its inner end with the plates or flanges 4 over which the sensitized film passes.

In the top of the camera box 1 is mounted the spindle 5 upon which is freely journaled the spool 6 carrying a length of sensitized film in the form of a tape.

7 indicates the sensitized film which passes from the spool 6 over the guide roller 8 above the top flange 4 and across the optical field to the lower guide roller 9 and from there to the winding spool 10 which is suitably fixed upon a shaft 11 journaled in a bearing 12 secured to the inside of the camera box. The shaft 11 extends through the side wall of the camera box and is provided with a crank handle 13 by which the winding spool 10 is rotated for drawing the film 7 constantly through the optical field and winding it upon the spool 10.

It will be observed that the winding spool 10 has a cylindrical body between its flanges of relatively large circumference so that the increase in circumference in winding the whole length of film upon the spool will be so slight that there will be no appreciable change in speed of the travel of the film so far as practical results are concerned.

15 is the rotary shutter formed with the radial exposure opening 16. The shutter 15 is suitably journaled upon a bracket arm 17 and is provided with a small bevel gear 18 meshing with a similar gear 19 keyed to a shaft 20 journaled in a suitable bearing (not shown), and carrying at its outer end a gear wheel 21 driven by the train of gears 22, 23, 24, 25. The gear 25 is keyed to a shaft 26 supported in suitable bearings and carrying a sprocket wheel 27 driven by a sprocket chain 28 and driving sprocket wheel 29. The sprocket wheel 29 is fixed upon the hand operated shaft 11. By the train of mechanism described, it will be understood that the shutter 15 is constantly rotated to intermittently expose a section of the constantly traveling sensitized film 7.

The front wall of the camera casing is provided with an opening 30 in line with the rear opening 2. Mounted in this opening 30 is the lens tube 35 carrying the usual lenses such as indicated at 36. The lens tube 35 is formed with a wide circular flange 37 which fits snugly against the front wall of the camera box and completely shuts out the light from the opening 30. It will be observed that the opening 30 is materially larger than the diameter of the lens tube 35 so that the tube 35 can move vertically in said opening. The lens tube 35 is mounted at its inner end in the threaded opening 38 of a rectangular frame or casing 40. The lens tube can be adjusted in any suitable manner (not shown) for focusing the camera. The casing 40 is mounted with two pairs of alined bearings 41 and 42 in which are engaged the vertical guide rods 45 rigidly supported at their opposite ends in bracket arms 46 and 47. The frame or casing 40 supporting the lens tube 35 has its rear wall arranged across the line of exposure and formed with an opening 39 in line with the lens tube to constitute a diaphragm for exposing the surface of the film to the action of the light rays passing through the lenses every time the opening in the shutter passes the line of exposure.

The lens carrying frame or casing 40 is movable vertically upon the guide rods 45 just described. Springs 50 are confined upon the rods 45 between the lower bracket 47 and lower bearings 41 and 42 of the frame to tend to move the frame upwardly upon its supports. The pair of links 55 is pivotally connected with the frame 40 at 56 and with a rocking lever 60 at 57. The lever 60 is journaled in suitable brackets at 61 and passes freely through a sleeve or bearing 62 swiveled upon a disk 63 which is fixed upon the shaft 26 above referred to. The rotation of shaft 26 drives the crank disk 63 in the direction indicated by the arrow to rock the lever 60 which reciprocates the lens carrying frame 40. As the lever 60 is rocked by the disk 63, it will be observed that the crank sleeve or bearing 62 slides upon the lever 60 and intermittently approaches and recedes from the lever pivot 61 so that the return or upward movement of the lens carrying frame 40 will be more rapid than the downward movement of the frame.

The mechanism for reciprocating the lens carrying frame is so proportioned with relation to the means for feeding the sensitized film and the means for operating the shutter that during the instant of exposure of the film by the passage of the opening in the shutter, the lenses will travel downwardly at substantially the same rate of speed as the exposed film. After each exposure and during the time that the shutter is closed, the lenses are rapidly moved upwardly into position in readiness for the succeeding exposure. In this operation, it will be understood that the actual time of exposure is very short, so that the required movement of the lens carrier in the direction of movement of the film is very slight, the moving pictures being taken at the approximate rate of fifteen per second.

With the improved arrangement of film spools, by which the winding spool is formed with a relatively large circumference, it will be understood that the increase in diameter from the empty spool to the wound spool will be so slight that there will be no material increase in the speed of the film as it is wound up. This arrangement enables me to employ a very simple film feeding device.

The main advantage in my improved construction of moving picture camera is its extreme simplicity by which I am able to obtain satisfactory results. With the improved arrangement, it is not necessary to intermittently arrest the movement of the film, nor to provide compensating take-up devices such as are ordinarily employed.

What I claim is:

1. In a kinetoscopic apparatus, the combination of suitable driving mechanism, a film support, a carrier mounted to reciprocate in relation to said support, a variable-leverage lever, and suitable means operatively connecting said driving mechanism and carrier with said lever, an objective mounted on said carrier, and mechanism for feeding the film at substantially the same speed as the lens during exposure.

2. In a kinetoscopic apparatus, the combination of suitable driving mechanism, a film support, a carrier mounted to reciprocate in relation to said support, a variable-leverage lever, connected at one side of its pivot to the carrier and operatively engaged at the other side of its pivot by a part of said driving mechanism, an objective mounted on said carrier, and mechanism for feeding the film at substantially the same speed as the lens during exposure.

3. In a kinetoscopic apparatus, the combination of a film support, a carrier, means for reciprocating said carrier in relation to said support, the same comprising a variable-leverage lever connected at one end to the carrier, an operating crank pin carried by the driving mechanism of the apparatus connected to the other end of the lever, an objective mounted on said carrier, and mechanism for feeding the film at substantially the same speed as the lens during exposure.

JOSEPH A. GOLDEN.

Witnesses:
ALFRED H. WOOLF,
ROBERT GOLDSTEIN.